United States Patent [19]

Llewellyn

[11] Patent Number: 4,891,622
[45] Date of Patent: Jan. 2, 1990

[54] ENCAPSULATED ELECTRONIC COMPONENTS

[75] Inventor: Alan D. Llewellyn, Taunton, Great Britain

[73] Assignee: Bowthrope Components Limited, London, England

[21] Appl. No.: 214,120

[22] Filed: Jun. 30, 1988

[30] Foreign Application Priority Data

Jul. 11, 1987 [GB] United Kingdom ............... 8716383

[51] Int. Cl.$^4$ .............................................. H01C 7/10
[52] U.S. Cl. .................................... 338/22 R; 29/612; 338/28
[58] Field of Search .................. 338/28, 22 R, 225 D, 338/25; 29/610.1, 612, 613

[56] References Cited

U.S. PATENT DOCUMENTS 4,445,109 4/1984 Naganoma et al. ............ 338/28 X

Primary Examiner—C. L. Albritton
Attorney, Agent, or Firm—Lee, Mann, Smith, McWilliams & Sweeney

[57] ABSTRACT

A thermistor probe comprises a pair of springy pins (P) held in a body (1) and resiliently holding a negative temperature coefficient (NTC) thermistor chip (TH) between their tips. A second body (31) of glass-loaded plastics is injection moulded over the pins and chip and bonds integrally with body (1) to enhance the contact pressure and encapsulate the probe.

The probe is suitable for vehicle engine air charge temperature measurement.

10 Claims, 5 Drawing Sheets

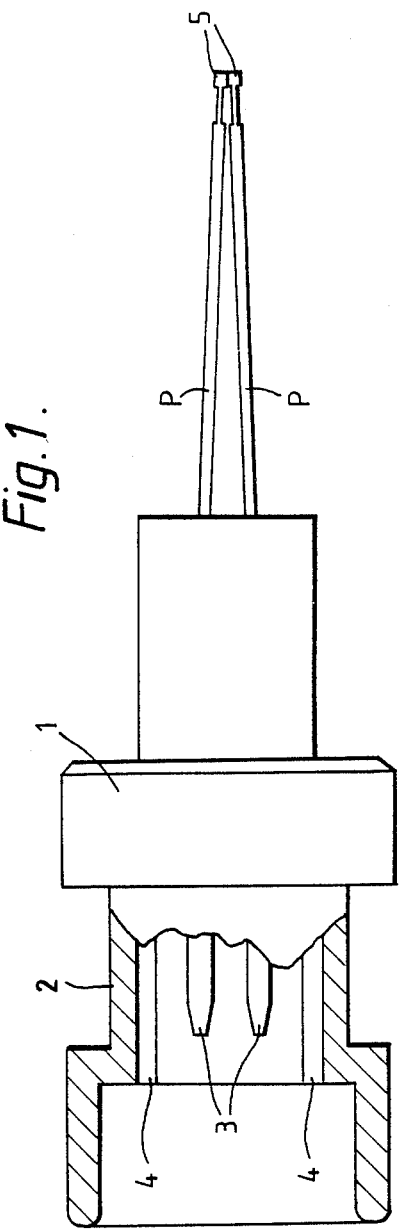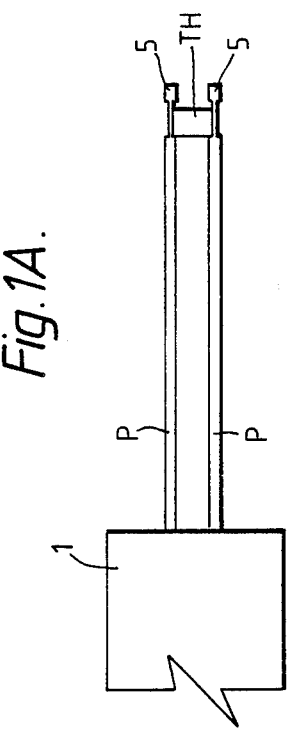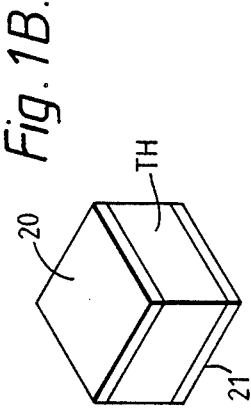

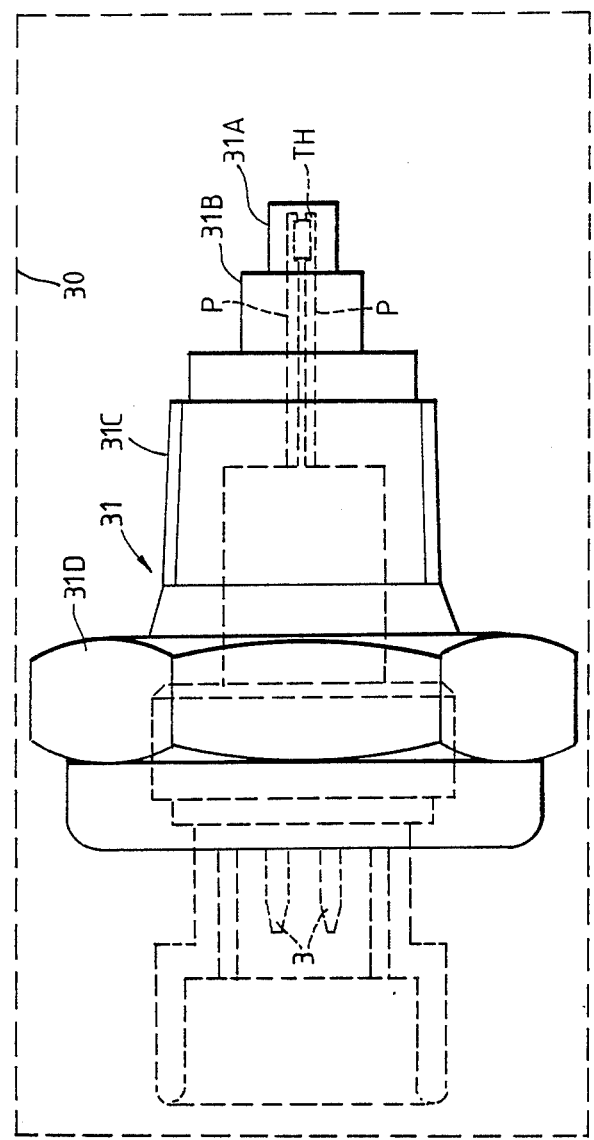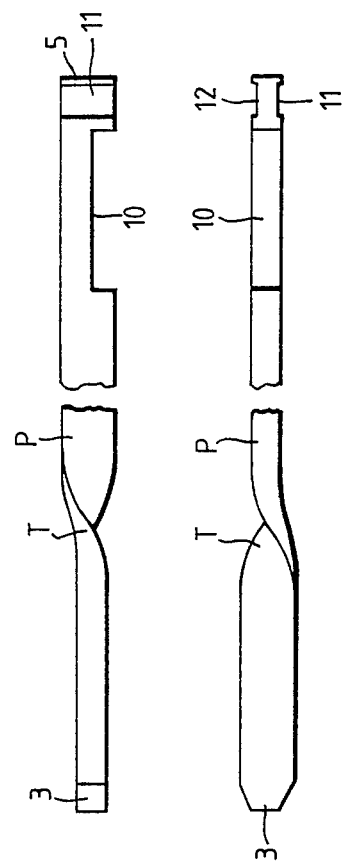
Fig. 2.
Fig. 3.

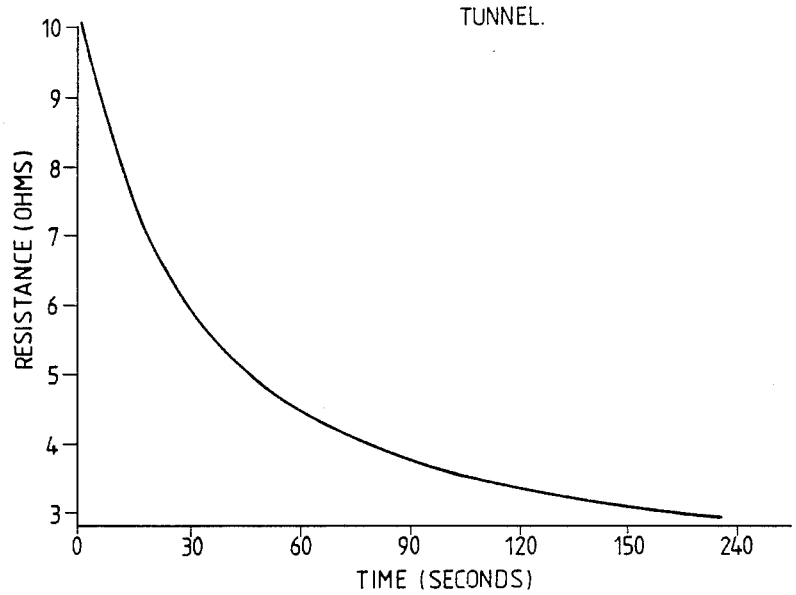
Fig.5. HEATING TIME RESPONSE IN WIND TUNNEL.
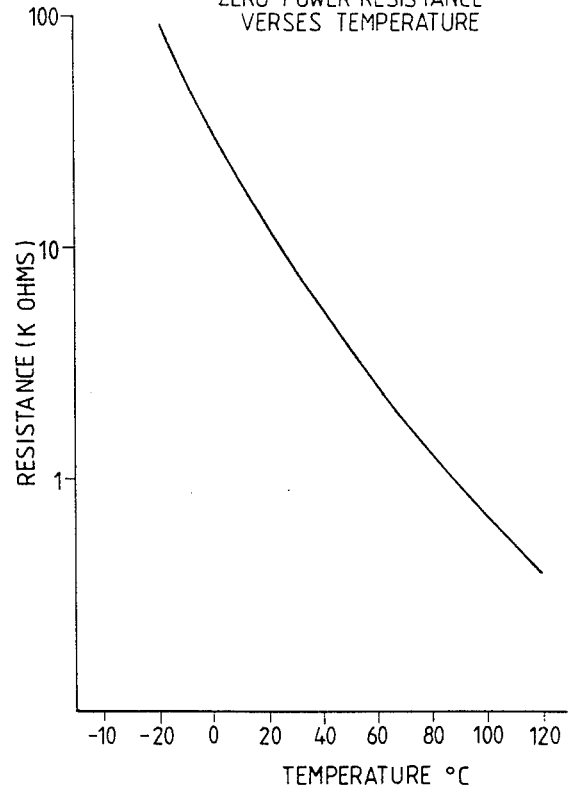
Fig.6. ZERO POWER RESISTANCE VERSES TEMPERATURE

ENCAPSULATED ELECTRONIC COMPONENTS

This invention relates to encapsulating electronic components, particularly but not exclusively thermistor temperature sensors and particularly but not exclusively sensors for automotive air charge sensing applications.

Modern fuel injected motor vehicle engine management systems have adopted micro computers that demand knowledge of temperatures, pressures and flow rates for optimum operating efficiency.

PRIOR ART

Negative temperature coefficient (NTC) thermistors e.g. a thermistor disc, enclosed within a suitable housing, have been used for many years to monitor engine temperatures. The thermistor disc is sleeved and crimped into a brass or steel probe body. One of the terminations (the earth termination) is connected to the probe body itself, and the second termination, being a blade or threaded stud, is connected via a compression coil or a leaf spring or a soldered wire that maintains contact between the thermistor disc face and the probe body.

With the use of microprocessors and the damage to them that can be associated with the inherent electrical noise in a motor vehicle, the sensor signals received through such an earth circuit are no longer acceptable.

It is also known from U.S. Pat. No. 4,478,588 to provide an LED between resilient contacts and to encapsulate by a resin potting in a container which forms a part of the finished component. Such a process would be unreliable over wide temperature ranges such as would be encountered by a temperature sensing component.

It is an object of the present invention to provide an encapsulated temperature-sensing electronic component, particularly but not exclusively a thermistor for vehicle applications, which is cheap to make and which is reliable in operation even under arduous conditions including wide temperature ranges and rapid temperature changes within these temperature ranges.

According to the present invention there is provided an electronic component including an electronic component element having two electrical connections and two electrical connection terminals making pressure electrical contact with the electrical connections, characterised in that the element is a temperature sensing element and in that a plastics material directly injection moulded over the component element and the electrical connection terminals maintains and enhances the pressure contacts.

According to another aspect there is provided a thermistor probe comprising a pair of connection terminals, a thermistor element resiliently held in electrical contact with and between said terminals, characterised by a moulded plastics insulating material encapsulating said element and said terminals at least in the region of said contact and reinforcing the contact pressure between said terminals and said thermistor element, and by said connection terminals being elongate between external electrical connection means and said thermistor elements.

According to yet another aspect there is provided a method of making an electrical component comprising providing a pair of electrical connection terminals, holding said terminals, inserting an electrical component element between and in electrical contact with said terminals so that it is resiliently held therebetween, and encapsulating said element and said terminals, characterised in that the encapsulation is by subsequently injection moulding a body of insulating material under pressure around said element and terminals so as to encapsulate the element and reinforce the contact pressure between the element and the terminals.

In order that the invention may be clearly understood, reference will now be made to the accompanying drawings which show an embodiment of the present invention and in which:

FIG. 1 is a side view of a thermistor temperature sensor probe for an internal combustion engine air charge application during a first stage of manufacture, and FIGS. 1A and 1B show details;

FIG. 2 is a side view of the probe of FIG. 1 which has been injection moulded with a loaded plastics material to encapsulate the element and the connection terminals;

FIGS. 5 and 6 show, respectively typical response time and resistance -temperature characteristics of the probe.

Figure 3A:
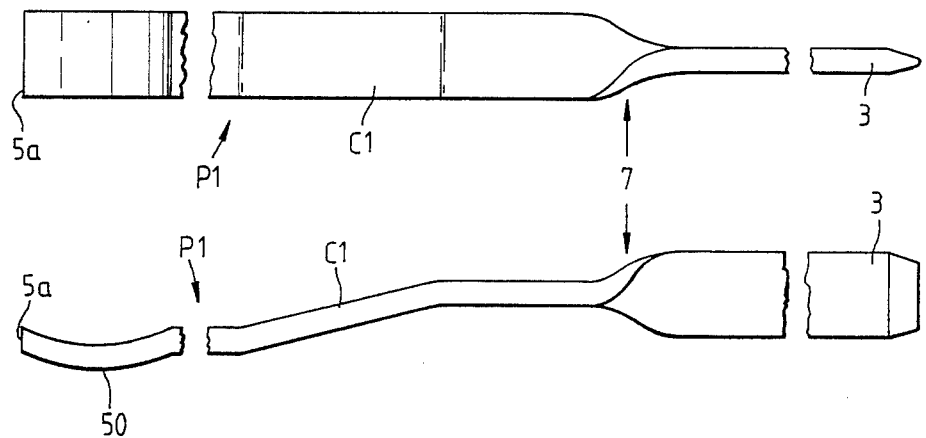
FIG. 3 shows a detail of the probe of FIGS. 1 and 2 and FIGS. 3A and 3B show alternatives to FIG. 3.

Referring now to the drawings, in FIG. 1 is shown a stage in the manufacture of the probe before encapsulation of the temperature sensing element takes place. The probe comprises an injection moulded plastics body 1 which in this particular embodiment is made of a glass-filled plastics material "NYLON 66".

At one end of the moulded plastics body 1 is defined a female electrical connection socket 2 having a pair of connection terminals 3 and defining a key-way 4 to ensure that the male plug can be fitted one way round only into the socket 2.

The connection terminals 3 are formed by end portions of integral springy connection pins P which in this embodiment are made of nickel-plated phosphor bronze with a coating of tin. These pins are shown in greater detail in FIG. 3 and are located in the injection moulding tool prior to pressure injection moulding the body 1. They are so located in the injection moulding tool that their opposite ends 5 are touching one another in the relaxed state of the connection pins.

Referring to FIG. 3 each pin P comprises a tin-coated nickel-plated phosphor bronze strip which is twisted through 90° at an intermediate position T between its ends. The ends 3 are profiled to provide the external connection terminals as discussed earlier for the electrical socket and at the other ends the pins are resilient and have a cut-away portion 10 which is designed to give the correct thermal response characteristics for the probe.

The ends 5 have opposed recesses 11 and 12 which co-operate to locate the thermistor chip TH in between as shown in FIG. 1A, and make electrical contact with the chip by virtue of the springyness of the pins.

Figure 3B:
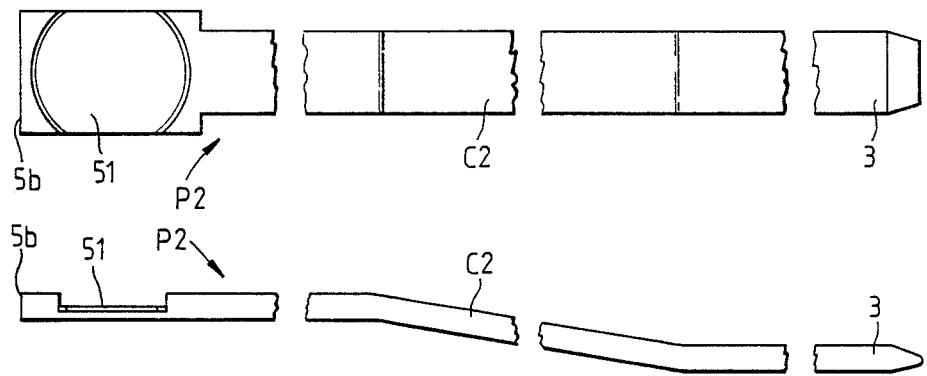

FIGS. 3A and 3B show in plan and side views an alternative pair of springy pins P1 and P2, each comprising a tin-coated nickel-plated phosphor bronze strip. P1 is twisted at 90° as previously at T whereas P2 is not. This variation can be applied to each pin depending on the final socket configuration.

P1 and P2 may be cranked at C1 and C2 so that the connection terminal ends 3 are offset outwardly from the chip-holding ends 5a and 5b. End 5a of pin P1 has a rounded contact-making surface 50 whereas the end 5b of pin P2 has a flat recessed contact making surface 51 which locates the chip TH in the recess. This arrangement of pins P1 and P2 enable chips of varying thickness to be held because surface 51 remains in flat engagement with the compaction surface of the chip, whereas surface 50 also makes good contact because it is gently rounded and tolerates fatter or thinner chips. Also surface 51 provides good thermal contact regardless of chip thickness.

Otherwise the pins P1 and P2 are of the same construction and function as pins P described above.

The next stage in the process is to insert the thermistor chip TH (FIG. 1B) in between the pins P as shown in FIG. 1A so that the pins are elastically forced apart and resiliently engage the chip.

The thermistor chip is an NTC device, in this embodiment, and has silvered contact faces 20 and 21.

Referring now to FIG. 2 the next stage in the process is to insert the probe end of the moulding from FIG. 1 into a second injection moulding tool 30 which injection moulds glass-filled "NYLON 66" plastics material under pressure around the thermistor chip TH and the pressure contact faces 11 and 12 and occupies the shape shown in outline in FIG. 2. The broken lines show the shape of the moulded body 1 produced according to FIG. 1, together with the pins P and thermistor TH.

The moulded material 31 bonds integrally with the moulding 1 and also shrinks slightly particularly around the contact pins P and the thermistor chip TH, whereby to cause the pins P to produce an enhanced contact pressure force on the thermistor chip TH and maintain that enhanced force in use of the probe. The pressure of the injection moulding process is also thought to increase the contact pressure.

The second moulding 31 has a probe end portion 31A which provides a plastic material thickness of about 1mm around the thermistor chip TH i.e. the thickness is great enough to seal the chip and give a measure of physical protection and also enhance the contact pressure on the chip. but the thickness is not great enough to provide a significant thermal barrier around the chip. The thermal response is illustrated in FIG. 5. The probe diameter increases at the step to 31B which surrounds the pins P, and increases yet again to 31C around the moulding 1, and provides a screw thread securing the probe in a threaded aperture in the fuel/air charging manifold of the motor vehicle engine.

Portion 31D is shaped as a nut to enable the probe to be screwed into or out of the aperture.

The pressure injection moulded material is glass fibre loaded "NYLON 66". The "Nylon 66" is loaded with about 33% by weight of glass fibres, but 25% or more will be satisfactory. Other forms of loaded plastics material would also be suitable and indeed an unloaded plastics material may also be suitable provided it shrinks on solidification and is strong enough to maintain the compression force due to shrinkage over a wide temperature range and for the life of the product.

The dimensions of the probe are as follows. The diameter of the probe tip 31A is 4 to 5 mm, portion 31B is about 7.5 mm diameter, portion 31C has a standard ⅜" tapered thread and portion 31D is a standard hexagonal nut contour. portions 31A and 31B are both about 5 mm in length.

The pins P project about 16 mm from the end of body moulding 1 to their tips 5.

The spacing between the pins P where they emerge from the body 1 is comparable with the thickness of the thermistor TH so that they extend substantially parallel to each other with the thermistor TH held between the faces 11 and 12, and lies in the range 0.1 to 0.6 mm.

The surface area of each contact face 11 or 12 is larger than the co-operating contact face 20 or 21 of the chip thermistor so ensuring that all the shrinkage force of the plastics encapsulating material in the region of the chip and in the direction of contact pressure, is applied solely through the pins P and not to the contact faces 20 and 21 directly.

Figure 4:
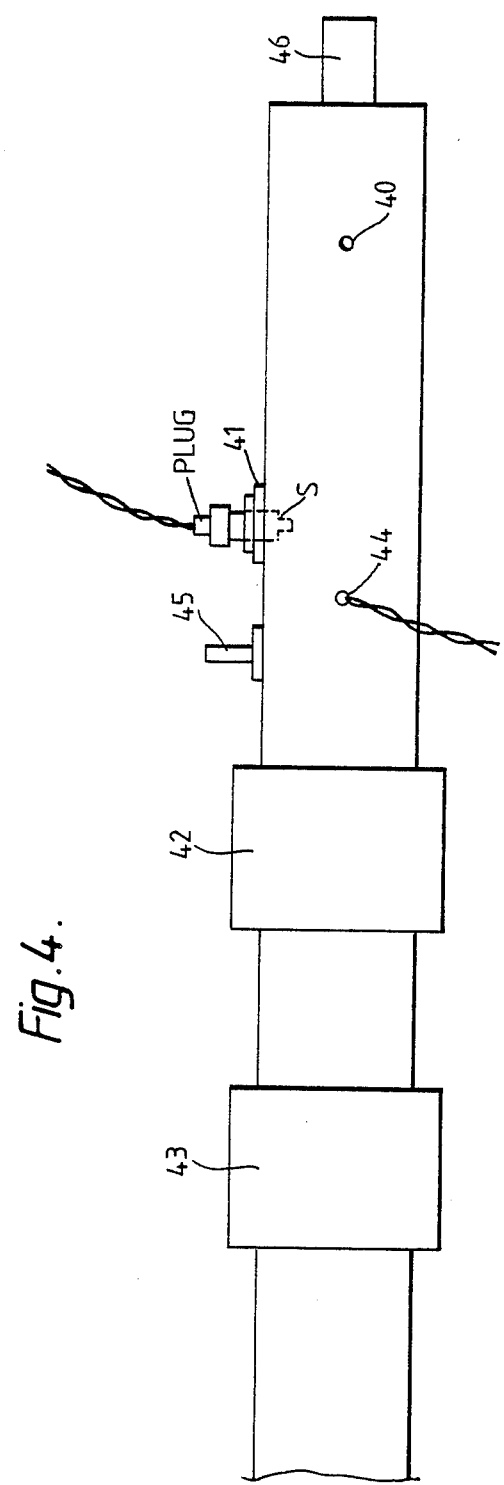
FIG. 4 shows the probe situated in test equipment which shows the air charge application for which the probe is intended.

Referring to FIG. 4 there is shown a test jig for testing response time in air of the sensor probe. The probe sensor is shown as S and the test jig simulates the air charging device for the vehicle internal combustion engine. The pipe 40 has a mounting boss 41 for the sensor probe S, a mercury manometer tap 45, an independent temperature sensor 44, a diffuser 42. A vacuum port 46 is coupled to a suction device to draw air through the pipe and a heater element 43 is used to change the temperature of the air over a wide range.

Referring to FIG. 5 the graph there shows the variation of resistance of the thermistor probe with time. Initially the probe was allowed to reach equilibrium at ambient temperature; it was then inserted in the test jig at time zero. The temperature of the air flowing through the test jig was 55 degrees Celcius above the ambient temperature.

FIG. 6 shows the resistance versus temperature characteristic for the sensor S.

We have found that the connections to the thermistor chip using the pressure contacts enhanced with the moulded plastics material, provide reliable connection to the device through a wide temperature range of $-20°$ C. to $+120°$ C.

The connection technique for the NTC thermistor probe described above would also be applicable to any other electronic component, for example a capacitor, a PTC thermistor, a capacitor, an integrated circuit chip, etc.

I claim:

1. An electronic component including an electronic component element having two electrical connections and two electrical connection terminals making pressure electrical contact with the electrical connections, characterised in that the element is a temperature sensing element and in that a plastics material directly injection moulded over the component element and the electrical connection terminals maintains and enhances the pressure contacts, and further characterised in that each connection terminal comprises an elongate springy metal member.

2. A component as claimed in claim 1, characterised in that said component element comprises a thermistor device.

3. A component as claimed in claim 1, characterised in that a second moulded insulating body holds the connection terminals and in that said directly injected plastics material forms a first moulded insulating body integrally bonded to said second moulded insulating body.

4. A component as claimed in claim 1, characterised in that said connection terminals each provide a connection in an electrical connector forming an integral part of said component for making external electrical connection to said component.

5. A thermistor probe comprising a pair of connection terminals, a thermistor element resiliently held in electrical contact with and between said terminals, characterised by a moulded plastics insulating material encapsulating said element and said terminals at least in the region of said contact and reinforcing the contact pressure between said terminals and said thermistor element, and by said connection terminals being an elongate springy metal member located between external electrical connection means and said thermistor elements.

6. A method of making an electrical component comprising providing a pair of electrical connection terminals, holding said terminals, inserting an electrical component element between and in electrical contact with said terminals so that it is resiliently held therebetween, and encapsulating said element and said terminals, characterised in that the encapsulation is by subsequently injection moulding a body of insulating material under pressure around said element and terminals so as to encapsulate the element and reinforce the contact pressure between the element and the terminals.

7. A method as claimed in claim 4, characterised by first moulding a second insulating body around said terminals away from the element to hold said terminals, and subsequently injection moulding the first-mentioned body so that it becomes bonded to the second body.

8. A component as claimed in claim 1, characterised in that said component element comprises a thermistor device.

9. A component as claimed in claim 1, characterised in that a second moulded insulating body holds the connection terminals and in that said directly injected plastics material forms a first moulded insulating body integrally bonded to said second moulded insulating body.

10. A component as claimed in claim 2, characterised in that a second moulded insulating body holds the connection terminals and in that

* * * * *